United States Patent [19]

Strate et al.

[11] Patent Number: 4,700,453
[45] Date of Patent: Oct. 20, 1987

[54] TURNING MACHINE

[75] Inventors: Hans Strate, Hanover; Hans-Dieter Simon, Laatzen, both of Fed. Rep. of Germany

[73] Assignee: H. Wohlenberg KG GmbH & Co., Hanover, Fed. Rep. of Germany

[21] Appl. No.: 800,595

[22] PCT Filed: Mar. 14, 1985

[86] PCT No.: PCT/DE85/00084
§ 371 Date: Nov. 12, 1985
§ 102(e) Date: Nov. 12, 1985

[87] PCT Pub. No.: WO85/04126
PCT Pub. Date: Sep. 26, 1985

[30] Foreign Application Priority Data

Mar. 17, 1984 [DE] Fed. Rep. of Germany ......... 3410276014

[51] Int. Cl.⁴ .................................... B23Q 3/155
[52] U.S. Cl. ........................ 29/568; 51/168; 82/36 A
[58] Field of Search ........... 29/27 C, 27 R, 39, 568; 82/36 A, 34 R, 35; 51/DIG. 4, 166 TS, 168

[56] References Cited

U.S. PATENT DOCUMENTS

| Re. 31,288 | 6/1983 | Matsvzaki | 29/27 C |
|---|---|---|---|
| Re. 31,304 | 7/1983 | Tsukiji | 29/27 C |
| 3,867,756 | 2/1975 | Koch et al. | 29/568 |
| 3,925,877 | 12/1975 | Junike et al. | 29/568 |
| 4,414,724 | 11/1983 | Garnett | 29/39 |

FOREIGN PATENT DOCUMENTS

| 354221 | 12/1979 | Austria | 29/568 |
|---|---|---|---|
| 1804630 | 4/1970 | Fed. Rep. of Germany | 29/568 |
| 1602810 | 6/1970 | Fed. Rep. of Germany | 29/568 |
| 2044187 | 3/1972 | Fed. Rep. of Germany | 29/39 |
| 2318778 | 5/1974 | Fed. Rep. of Germany | 29/568 |
| 3244084 | 5/1984 | Fed. Rep. of Germany | 29/39 |
| 3432371 | 6/1985 | Fed. Rep. of Germany | 29/27 C |

OTHER PUBLICATIONS

Werkstatt and Betrieb, vol. III, No. 8, Aug. 1978, pp. 501-504, W. Kalmbach.

Primary Examiner—William R. Briggs
Attorney, Agent, or Firm—Dressler, Goldsmith, Shore, Sutker & Milnamow, Ltd.

[57] ABSTRACT

The invention concerns a lathe which is designed as a processing center and with which other working processes can be carried out in addition to turning work. The tool post (5) contains a processing turret (9) which can be rotated around a vertical axis as well as secured at various angles. The processing turret is equipped with a spindle unit (that can be powered) 11 to hold the tools and has at least one holding fixture (13) for temporary attachment of tools or working units. For tool exchange purposes the tool magazines (14, 15) are placed on the lathe; these allow for a quick exchange of tools and/or tool units. The lathe according to the invention allows a complete working of basic cylinder shapes and—based on retooling and transportation time alone—makes superfluous several machine tools which can perform only one work operation.

16 Claims, 13 Drawing Figures

TURNING MACHINE

The invention concerns a lathe with a driving arrangement for a workpiece holding fixture, with a tailstock and with a tool post which can be moved on the bench.

Cylindrical shapes can be manufactured and worked with such lathes. However, in actual manufacturing it often turns out that workpieces with basic cylindrical shapes very often have to undergo subsequent milling or drilling work. Such work includes, for instance, the manufacture of round plugs with internal or external threads of larger dimensions.

One possible solution lies in having to rechuck the workpiece after the turning in one or even several expensive other tool machines, each performing one work operation only.

In order to avoid this expense, machines have been developed with which a workpiece can be finished incompletely. This, however, necessitates the use of different processing units, such as turretheads, milling units, and grinding units which cannot be attached to one machine at the same time without colliding with each other. For this reason the machining unit in question has been designed so that it is interchangeable which, in case of heavy machinery, is not always economically justifiable because of the long retooling and transportation time required.

The invention is based on the task of providing a lathe of the above-mentioned type which in addition to the turning operation can carry out other working operations with equal efficiency, such as boring, deep drilling, milling, turning/milling, grinding, honing, and sinking so that a complete processing of basic cylinder shapes is possible without resulting in long retooling and transportation times.

The task thus defined is solved according to the invention by the fact that the tool post has a processing turret which can move around a vertical axis as well as be secured at various angles, and by the fact that the processing turret is equipped with a turnable spindle unit to hold the tools and that it has at least one holding fixture for temporary attachment of tools or machining units.

Because the tool post can revolve around a vertical axis, an optinal tool placed on the spindle unit, such as, for instance, a milling tool or another tool placed in the tool holding fixture can be used in the working.

The processing turret is rotatable around its axis by (motor) power, and the rotation is controlled digitally so that the desired angle of the processing turret—and thereby the operating position of the tool to be inserted—can be programmed. The processing turret can, of course, also be rotatable by manual means around its axis.

It is preferable that the spindle unit and the tool holding fixture are positioned at opposite sides of the processing turret so that, in general, the turret can be rotated in steps of 90 or 180 degrees in order to place the desired tool in question in its working position.

The processing turret can, however, be secured at any chosen angle; this can be accomplished in a simple manner by, for instance, conventional gear rings.

In the construction according to the invention the spindle unit is attached in such a manner that it can be adjusted in the height. The vertical adjustment is digitally controlled so that a higher degree of freedom in the movement of the tools powered by the spindle unit is ensured. If necessary, this also makes it possible to get the spindle out of the way when it is not needed for shifting to a plane differing from the main axis of the machine 39 for processing purposes.

It is an advantage if the spindle unit is equipped at both ends with a tool holding fixture since it is then possible to insert a tool, e.g. a milling tool, in both ends in such a manner that one or the other tool can be placed in the operating position by turning is 180 degrees which means that the end planes of the workpiece can be approached from both sides.

When the spindle of the spindle unit has a independent, digitally controlled drive, the latter can be used instead of the driving arrangement for the workpiece holding fixture. In this instance it is preferable that the driving arrangement for the workpiece holding fixture can be disconnected and a digitally controlled drive intended for a precise fixation of an angle or a digitally controlled feed of the workpiece can be activated instead. This makes possible, for instance, to carry out lathe work and subsequent milling work without any change of tools if the turning tool is placed in the holding fixture of the processing turret and a milling tool is placed in the spindle unit. In addition hereto, a turning-/milling workpiece is possible in which not only the tool but also the workpiece rotate.

A very quick exchange of tools can be achieved when the tools and/or tool units to be placed in the tool holding fixture are placed in a magazine carrier.

In this connection it is advantageous to place the magazine carrier behind the tailstock and to connect the magazine carrier mechanically to the tailstock so that it follows its shifting movements. The change-over time can hereby be shortened if the tool post that receives the tool is arranged so that it can move past the tailstock up to the front of the magazine carrier. The magazine carrier may, of course, also have its own feed drive.

In this instance it is preferable if the tool post that is to receive the tool can move past the tailstock up to the magazine carrier so that the transfer of the tool to the working unit can take place there automatically.

The tools and/or tool units are preferably arranged on similarly designed pallets which can be frictionally and form-lockingly connected to the holding fixture at the processing turret. This makes it possible to exchange all—even large and heavy—working attachments automatically and by computer.

The holding fixture contains two right-angled, adjacent contact surfaces for the pallet of which the shorter one runs horizontally and the longer one runs vertically. Horizontally running guides are provided in the vertical contact surface onto which the pallet can be pushed from the side.

It is preferable if a middle guide rail as well as upper and lower guide rails are at hand. The upper and lower guide rails should be designed as tension guides. This allows the pallet to be secured in a simple manner after it has been placed in position.

In order to facility the insertion, it is preferable that the tension guides are equipped with rollers at their free ends which interlock with the pallet's contoured grooves.

In addition hereto, track-supporting rollers are positioned in the horizontal contact surface which, under normal conditions, lie below the contact surface but which incase of exchange of pallets can be raised so far up that they extend above the contact surface. The insertion of the pallet is hereby made significantly easier.

In order to ensure that the pallet actually stays in its desired working position, it is a good idea to provide a pressure device which the help of which the inserted pallet is pressed against the horizontal contact surface.

For the sake of expediency a hydraulic drive is available for each tool unit in the magazine carrier with the help of which the assigned pallet can be inserted (slid) into the holding fixture as well as removed from it and moved back into the magazine. This makes possible a quick exchange of tools without exchange of expensive auxiliary attachments.

An additional stationary magazine toward which the tool post can move is preferably at hand for long tools. It is hereby possible to carry out deep drilling or internal turning work with long drill rods on the same machine.

In the following the invention will be described in greater detail with the help of examples of construction illustrated by drawings.

Figure 1:
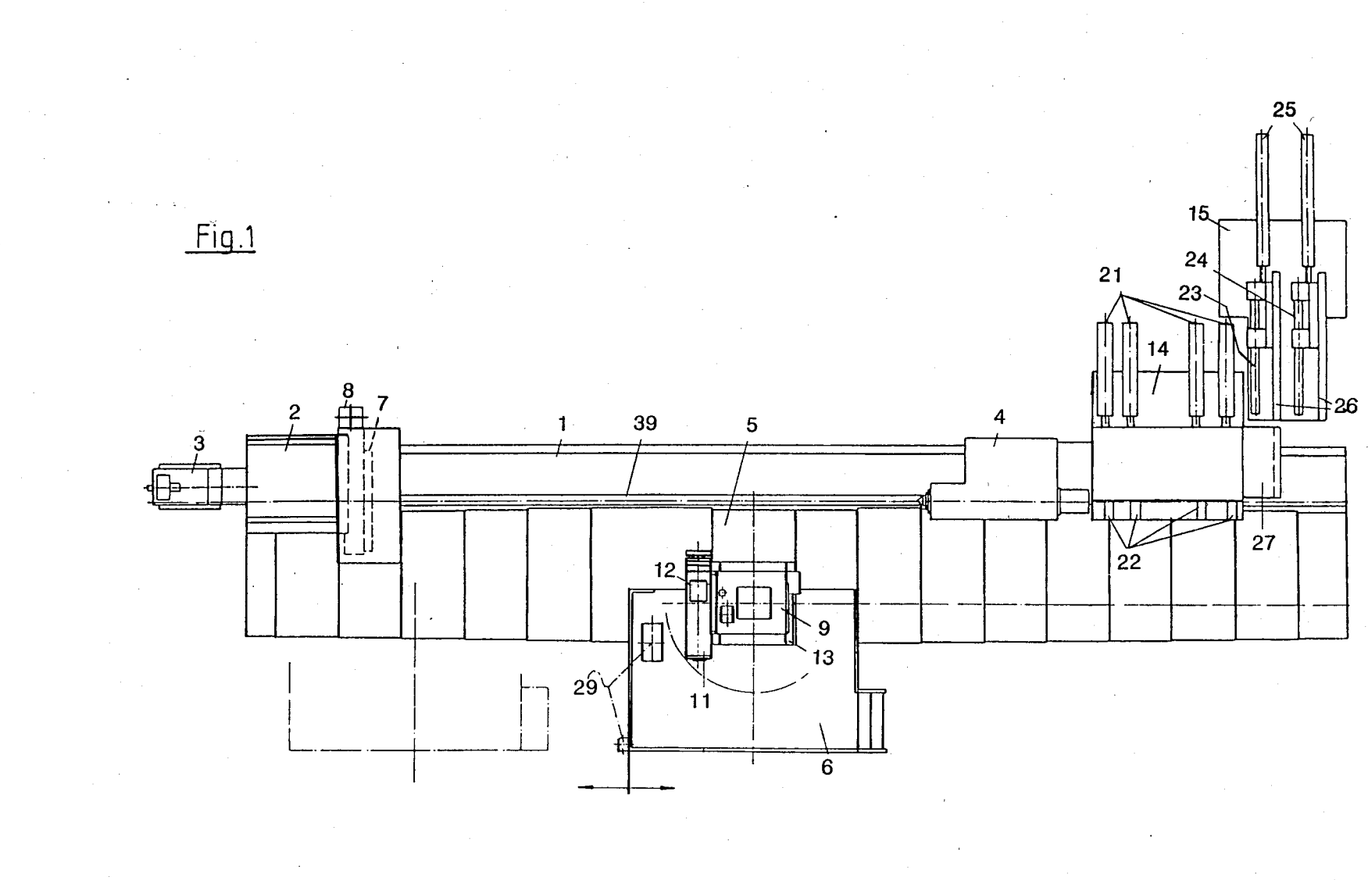
FIG. 1 A plan view of a lathe constructed according to the invention.
Figure 2:
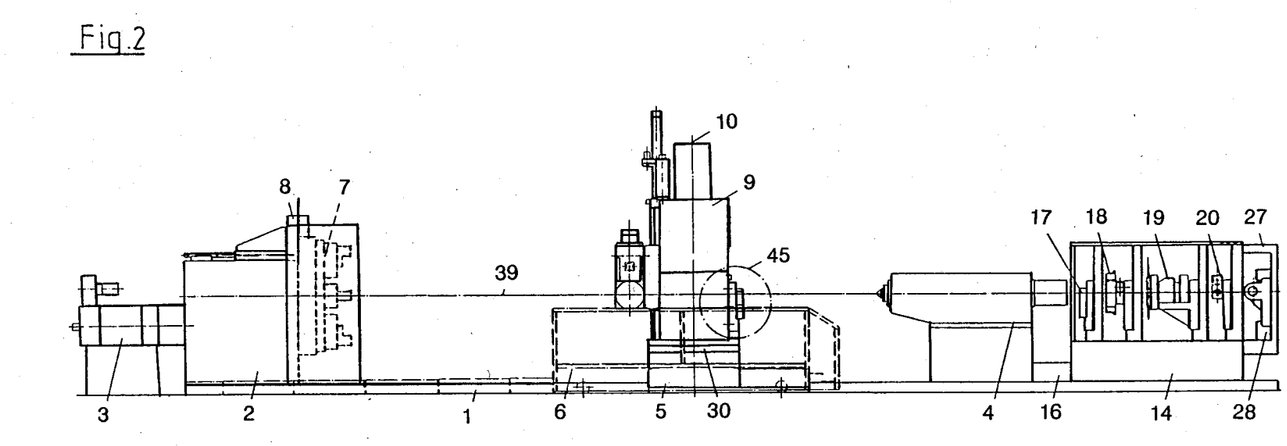
FIG. 2 A side view of the machine illustrated in FIG. 1.
Figure 3A:
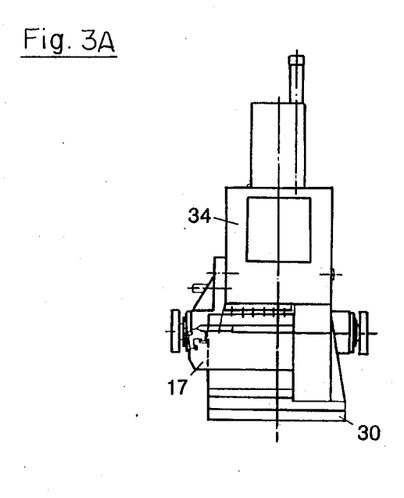
FIGS. 3a, 3b, 3c and 3d Side view, front view, back view and plan view of the processing turret.
Figure 3B:
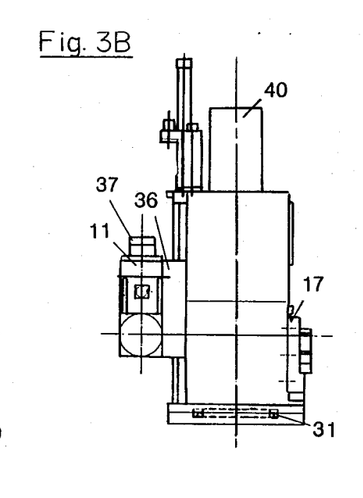
Figure 3C:
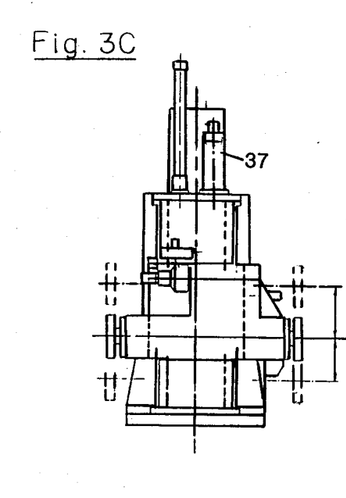
Figure 3D:
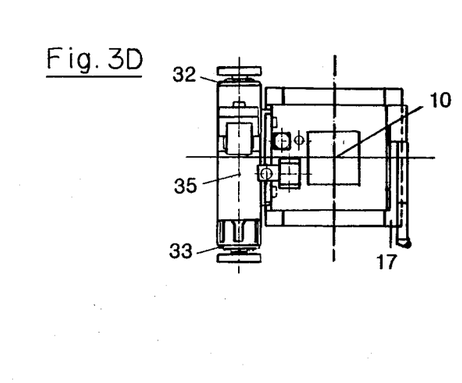

The lathe shown in FIGS. 1 and 2 contains a bench 1, a headstock 2, a driving arrangement 3 connected to the headstock, a tailstock 4, and a tool post 5 which along with a working platform 6 can move on the bench 1. A workpiece (not shown) can be clamped between a tool holding fixture 7, designed either as a chuck or a faceplate, and the tailstock 4 and put in rotation by the driving arrangement 3 and the headstock 2. The driving arrangement 3 can be disconnected. The tool holding fixture 7 then works as a rotating axis and can be powered by a digitally-controlled drive 8 with which the workpieces can be adjusted at exact angles or with which a digitally-controlled feed of the workpiece can be obtained.

A central processing turret, described in detail later, is placed on the tool post 5 and is turnable around the vertical axis 10. The processing turret 9 carries all working attachments and is equipped according to the task in question. It has a somewhat rectangular shape and is equipped with a spindle unit 11 at one of its sides. This spindle unit has an independent driving arrangement 12. A holding fixture 13 on the side opposite the spindle unit is provided for the temporary attachment of tools or working units.

These tools and/or working units are placed in two magazines 14 and 15. Magazine 14 is designed as a (sliding) carrier and is moveable on the bench 1. It is preferable that the magazine carrier 14 is connected to the tailstock 4 with a connecting piece 16 so that it is dragged along by the former and time is saved when exchanging tools. The magazine carrier can also be equipped with its own drive.

In the example of construction illustrated, the magazine carrier 14 contains 4 tool units: a lathe tool slide 17, a disk turret head 18, a turret head 19 with powered tools and a drilling feed unit 20.

The tool post 5 can be moved past the tailstock 4 up in front of the magazine 14 to any position that makes it possible to push one of the tool units 17-20 into the tool holding fixture 13 of the processing turret. In order to transfer the tool, each tool unit is connected to a hydraulic piston 21 which inserts or withdraws the tool unit in question into/from the holding fixture 13 with the help of a guide 22 aligned with the holding fixture 13. During the tool transfer the processing turret 9 is turned 180 degrees in relation to the illustration in FIG. 1.

Magazine 15 is permanently fixed staggered to magazine 14 at or next to the machine. In the example illustrated it contains two long tools in the form of two drill rods of different lengths 23 and 24. The tool units 23 and 24 are also moveable on guide 26 back and forth in the direction of the processing turret 9 with the help of a hydraulic piston 25. A shoulder 27 with a guide 28 is placed on the side of the magazine 14 because of the staggering in relation to the magazine 14; the guide 28 always forms a continuation of one of the guides 26.

The work platform 6 is equipped with operating panels 29 from which all movements concerning the working and the exchange of tools, including the turning of the processing turret 9, can be programmed and controlled.

FIG. 3 shows three views and a plan view of the processing turret 9 in greater detail. The support 34 of the processing turret 9 is connected to the tool post 5 by a base plate 30. The processing turret can be placed in any rotational position in relation to the tool post 5 with the help of conventional gear rings 31 and secured against working torques. The spindle unit 11 is located on one side to the support; in the example of construction shown the spindle unit is used as a milling device. The spindle unit has two tool holding fixture heads 32 and 33 which are positioned coaxially to the spindle axis 35. The spindle unit 11 is placed on a sliding carriage 36 which moves vertically with the help of an engine 37 in such a manner that the spindle unit can be moved vertically by digital control for working tasks or, if not needed, can be brought out of the way. The vertical movement is indicated in the right view in FIG. 3.

The spindle unit 11 has an independent driving arrangement 37 which, preferably, can be controlled digitally in the same manner as the vertical movement of the sliding carriage 36 and the rotary movement of the processing turret 9 around the vertical axis 10. When the spindle unit 11 is used for milling work, the driving arrangement 37 takes over the function as main drive while the driving arrangement 3 is disconnected and the drive 8 positions the workpiece at such an angle that the milling work or a digitally-controlled feed can take place.

A lathe tool slide 17 is placed in the holding fixture on the side of the support 34 opposite the spindle unit 11. A turning operation, for instance, and a subsequent milling operation can be carried out without interruptions due to rechucking or exchange of tools with a processing turret equipped in this manner. The support 34 and all attachment units are powered by a central rotary transmission 40 along the vertical rotary axis 10.

The versatility of the machine constructed according to the invention can be seen from FIGS. 4-8.

Figure 4:
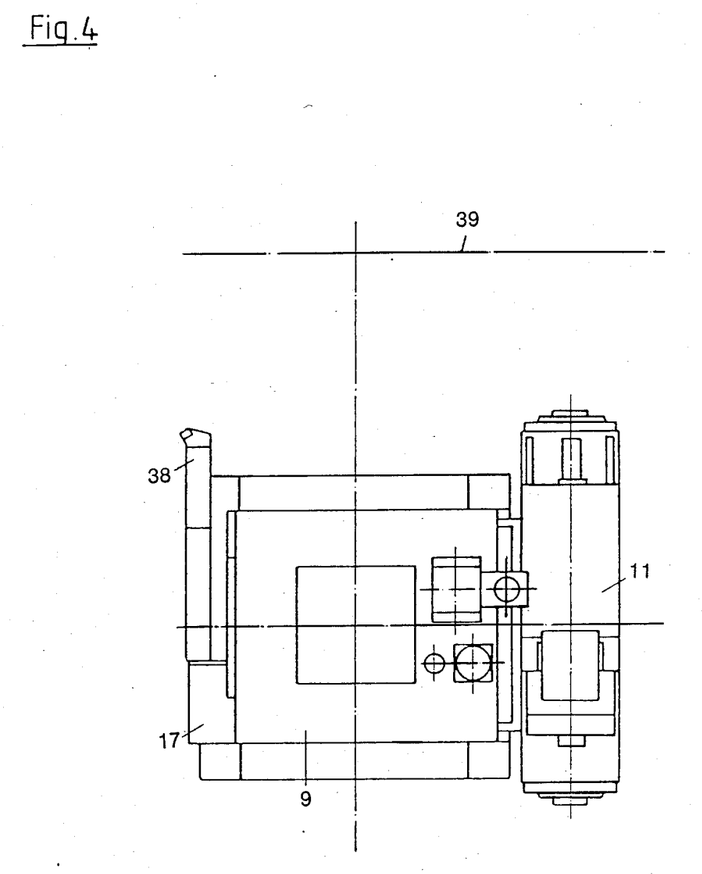
FIG. 4 Plan view of the processing turret equipped with a turning tool, in a common working position.

FIG. 4 shows the processing turret 9 equipped with just a lathe tool slide 17; the turning tool 38 is located in a common working position in relation to a workpiece cented on the main axis of the machine 39.

Figure 5A:
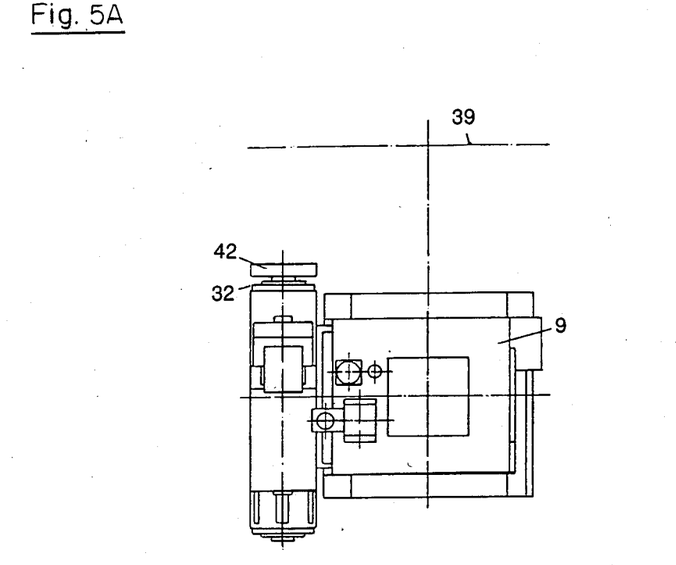
FIGS. 5a and 5b The spindle drive equipped with a milling tool in two positions, shifted 180 degrees.
Figure 5B:
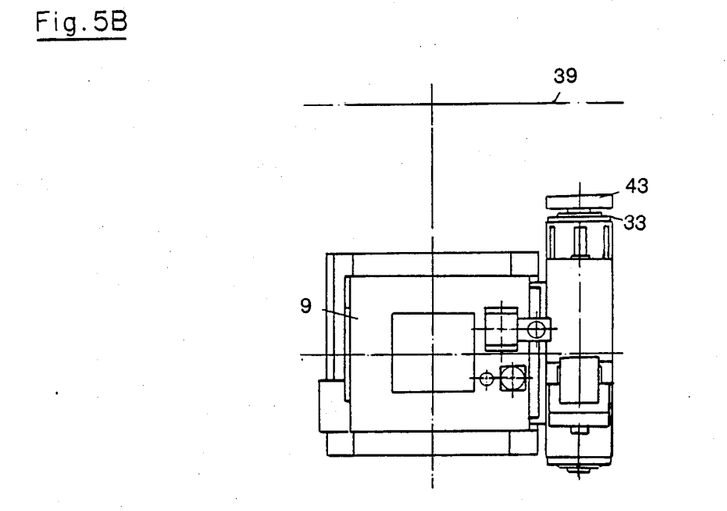

FIG. 5 shows the processing turret 9 equipped with milling tools 42 and 43 in the two holding fixtures 32 and 33 in various positions; this makes it possible to approach the workpiece from two sides.

Figure 6:
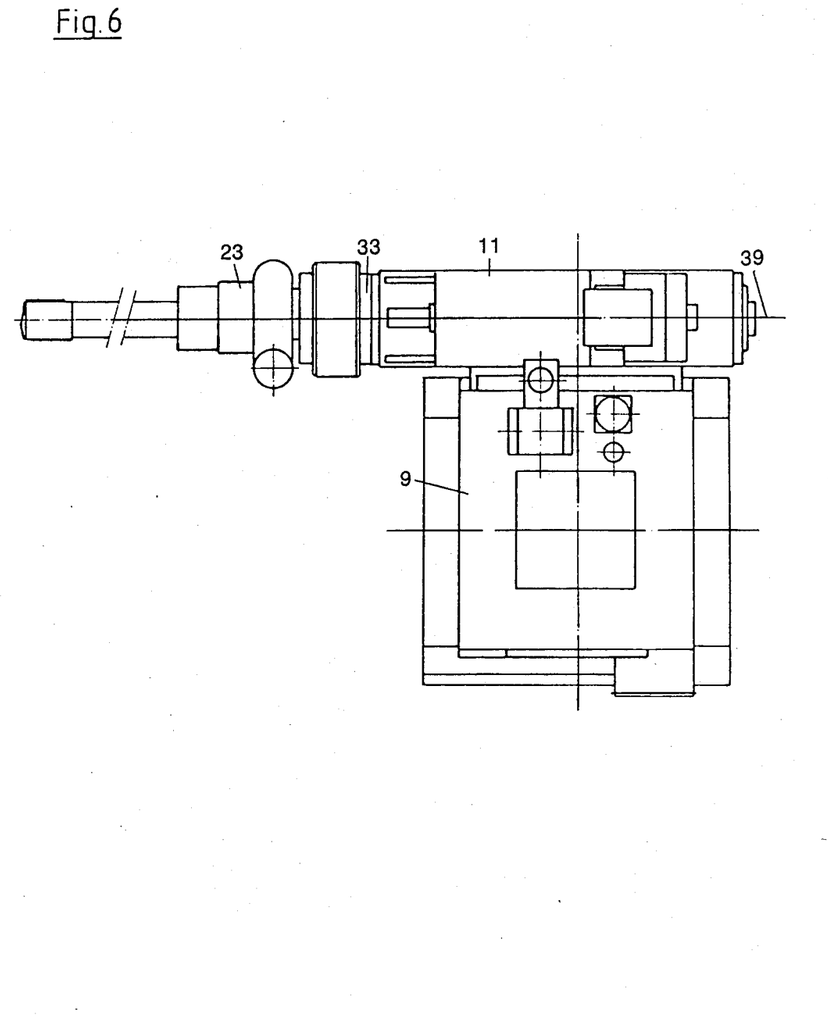
FIG. 6 The spindle unit equipped with a deep drilling unit.

FIG. 6 shows the equipment with a deep drilling device 23 which in this instance is placed on the tool holding fixture 33 on the spindle 11 in such a manner that a boring coaxial to the main axis of the machine 39 can be carried out in the workpiece.

Figure 7:
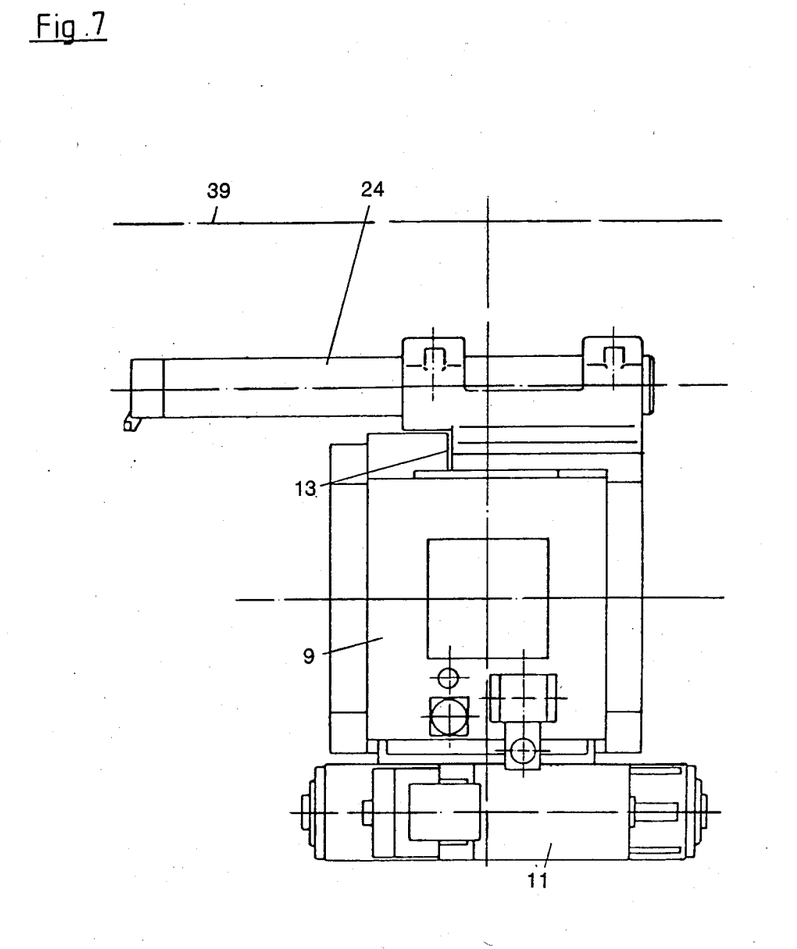
FIG. 7 Attachment and positioning of a drill rod device in the holding fixture.

FIG. 7 shows the processing turret 9 with a drill rod attachment 24 in the holding fixture 13.

Figure 8:
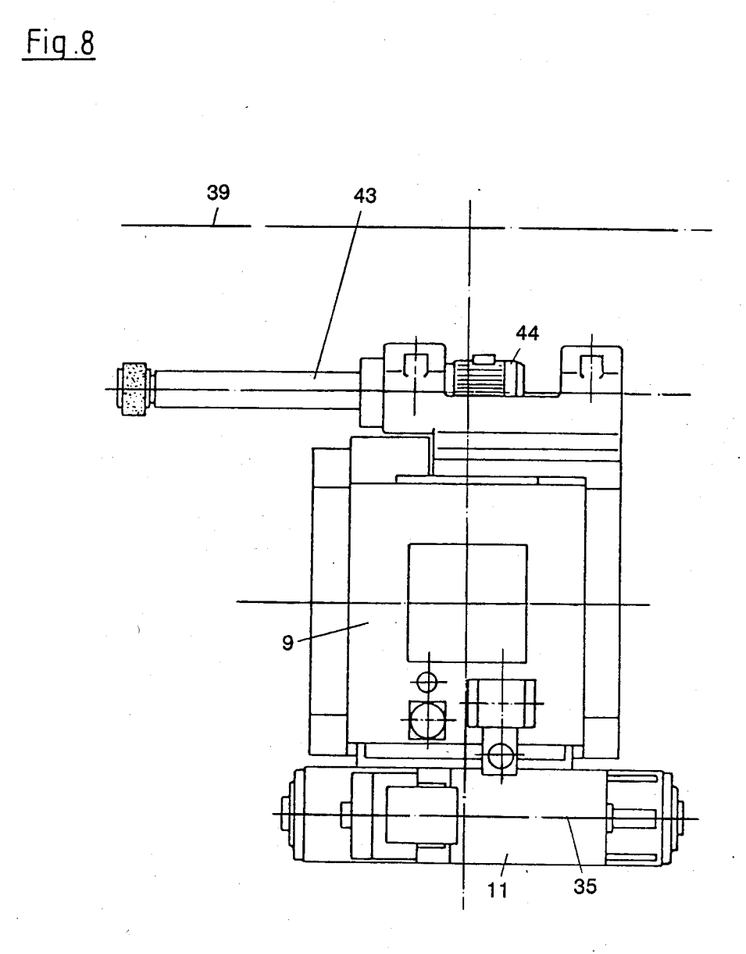
FIG. 8 Attachment of a grinding wheel equipped with drive in the holding fixture.

Finally, FIG. 8 shows the processing turret 9 equipped with a grinding head 43 which can be powered by an independent motor 44.

In the examples of construction illustrated, the processing turret 9 is always shown in positions in which the middle axis 35 of the spindle unit 11 is either parallel or at a right angle to the main axis of the machine 39. If necessary, the processing turret can, of course, also be adjusted in such a manner that the axis 35 is at an angle to the main axis of the machine 39.

Figure 9:
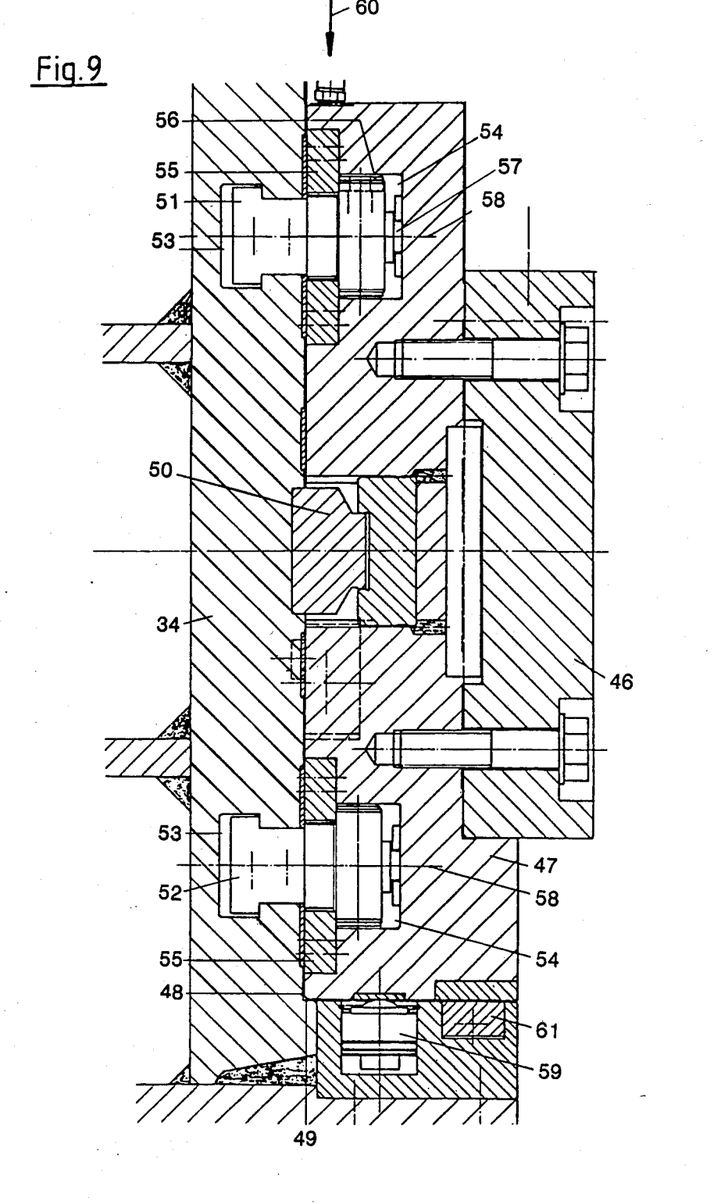
FIG. 9 Securing of a tool pallet in the holding fixture.

In FIG. 2 a tool placed in the holding fixture is only indicated schematically within the dotted circle. FIG. 9 shows the content of circle 45 in an enlarged view. Here, the details of the attachment and the securing of the tool unit on the support 34 of the processing turret 9 can be made out more easily.

It can be seen that the tool slide 46 is secured on a pallet 47 and that the pallet 47 has the same design for all tool units so that all tool units fit into the holding fixture of the support 34. The pallet can be connected with the holding fixture and secured by friction and shape.

The holding fixture has two adjacent, right-angled contact surfaces 48 and 49 for the pallet. The shorter surface 49 is horizontal and the longer surface 48 is vertical. The vertical contact surface is equipped with three guides running horizontally onto which the pallet 47 can be loaded/pushed from the side with the help of the hydraulic piston 21 belonging to the magazine carrier 14 (FIG. 2). The middle guide 50 consists of a rail fastened on the support 34 which provides a rough guidance for the insertion of the pallet. The upper guide 51 and the bottom guide 52 are designed as tension guides which rest with some slack in T-shaped recesses 53 in the support and catch (lock into) contoured grooves in the pallet 47 with their free ends which extend beyond contact surface 48. The contoured grooves 54 are also T-shaped so that the free ends of the tension guides catch behind the rail 55 placed on the pallet 47. In order to remove the load during insertion and removal of the pallet, rollers 56 an 57 are placed at the free ends of the tension guides. The rollers can be rotated around the axis 58.

Track-supporting rollers or supporting bearings 59 are embedded in the bottom contact surface 49. They normally lie below the contact surface 49 but, in case of exchange of pallet, they can be raised so far up (with the help of a device not shown) that they extend above the contact surface. When the pallet 47 is pushed either in or out, it moves along on the supporting rollers or bearings 59.

After the pallet has reached its desired position in the holding fixture, the supporting rollers/bearings 59 are lowered so that the pallet rests on the contact surface 49. A pressure device 60, which is only indicated by an arrow, ensures that the pallet rests correctly on the surface 49. Once the pallet 47 has been placed in position, it is caught by the wedge shoe 61.

As the final step the tension guides 51 and 52 are activated hydraulically so that they draw the pallet 47 against the contact surface 47. The pallet has then reached its final operating position which can be duplicated at any time and with any other pallet.

The design of the processing turret according to the invention and the design of the accompanying tool magazine and tool exchange device are a great advantage, especially for heavy turning machines where large and therby extremely heavy workpieces must be subjected to several working operations. The lathe tool slide 17 alone weighs more than 12 t in actual operation, so it is obvious how the measures outlined by the invention can make the process easier.

We claim:

1. A lathe (turning machine) having a bench, a headstock, a driving arrangement for a workpiece holding fixture associated with the headstock, a tailstock, and a tool post movable along the bench, and characterized by the fact that the tool post (5) is provided with a processing turret (9) which is rotatable around a vertical axis (10) and securable at various angles, and by the fact that the processing turret is equipped with a drivable spindle unit (11) equipped with tool holding fixtures (32, 33) at both of its ends, and with at least one holding fixture (13) for temporary attachment of tools or machining units (17-20); said spindle unit being movably mounted on the processing turret so that its height is adjustable and being provided with a digital control means for said height adjustment.

2. Lathe according to claim 1, characterized by the fact that the processing turret (9) is rotatable around its axis (10) by (motor) power and the rotation is controlled digitally.

3. Lathe according to claim 1, characterized by the fact that the processing turret (9) can be manually turned around its own axis.

4. Lathe according to claims 2 or 3, characterized by the fact that the spindle unit (11) and the holding fixture (13) are placed on opposite sides of the processing turret (9).

5. Lathe according to claim 4, characterized by the fact that gear rings (31) serve to secure the processing turret at the angles chosen.

6. Lathe according to claim 1, characterized by the fact that the spindle of the spindle unit (11) has an independent, digitally-controlled drive.

7. Lathe according to claim 6, characterized by the fact that the driving arrangement (3) for the workpiece holding fixture (7) can be disconnected and a digitally-controlled drive intended for a precise fixation of an angle or a digitally-controlled feed of the workpiece can be activated instead.

8. A lathe having a bench, a headstock, a driving arrangement for a workpiece holding fixture associated with the headstock, a tailstock, and a tool post movable along the bench, and characterized by the fact that the tool post (5) is provided with a processing turret (9) which is rotatable around a vertical axis (10) and securable at various angles; by the fact that the processing turret is equipped with a drivable spindle unit (11) adapted to receive a tool and with at least one holding fixture (13) for temporary attachment of tools or machining units (17-20); and by the fact that the tools or machining units (17-20) to be placed in the tool holding fixture (13) are positioned in a magazine carrier (14) located behind the tailstock (4) and provided with its own feed drive.

9. A lathe having a bench, a headstock, a driving arrangement for a workpiece holding fixture associated with the headstock, a tailstock, and a tool post movable along the bench, and characterized by the fact that the tool post (5) is provided with a processing turret (9) which is rotatable around a vertical axis (10) and securable at various angles, the tool post (5) being movable for tool transfer past the tailstock (4) and in front of a magazine carrier (14); by the fact that the processing turret is equipped with a drivable spindle unit (11) adapted to receive a tool and with at least one holding fixture (13) for temporary attachment of tools or machining units (17-20); by the fact that the tools or machining units (17-20) are arranged on pallets (47) adapted for securement to holding fixture (13) at the processing turret (9) by friction and shape; by the fact that the holding fixture (13) is provided with two adjacent, substantially right-angled support surfaces (48, 49) for said pallets (47), the relatively shorter of said support surfaces (49) running horizontally and the relatively longer of said support surfaces (48) running vertically; and by the fact that the vertical support surface (48) has horizontal tension guides (50, 51, 52) for receiving the pallets (47).

10. A lathe having a bench, a headstock, a driving arrangement for a workpiece holding fixture associated with the headstock, a tailstock, and a tool post movable along the bench, and characterized by the fact that the tool post (5) is provided with a processing turret (9) which is rotatable around a vertical axis (10) and securable at various angles; by the fact that the processing turret is equipped with a drivable spindle unit (11) adapted to receive a tool and with at least one holding fixture (13) for temporary attachment of tools or machining units (17-20); and by the fact that the tools or machining units (17-20) to be placed in the tool holding fixture (13) are positioned in a magazine carrier (14) located behind the tailstock (4) and connected mechanically to the tailstock (4) so as to follow its movement.

11. Lathe according to claim 9, characterized by the fact that an additional stationary magazine (15) for long tools (23, 24) is provided next to the magazine carrier (14) and that the tool post (5) is movable up to said magazine (15).

12. Lathe according to claim 10, characterized by the fact that a hydraulic drive (21) is available for each tool unit (17-20) in the magazine carrier (14) with the help of which the assigned pallet can be pushed into the holding fixture (13) as well as removed from it and moved back into the magazine carrier (14).

13. Lathe according to claim 9, characterized by the fact that the horizontal upper and lower guides (51 and 52 respectively) are tension guides.

14. Lathe according to claim 13, characterized by the fact that the tension guides (51, 52) are equipped with rollers (56, 57) at their free ends which interlock with contoured grooves (54) in said pallets (47).

15. Lathe according to claim 14, characterized by the fact that track-supporting rollers or bearings (59) are positioned in the horizontal support surface (49) normally below the plane defined by said support surface (49) but are elevatable to extend beyond the plane of the support surface when the pallets (47) are exchanged.

16. Lathe according to claim 15, characterized by the fact that a pressure device (60) is provided with the help of which an inserted pallet (47) is pressed against the horizontal support surface (49).

* * * * *